United States Patent [19]

Iuchi et al.

[11] Patent Number: 5,132,197

[45] Date of Patent: Jul. 21, 1992

[54] OXYTITANIUM PHTHALOCYANINE, PROCESS FOR PRODUCING SAME AND ELECTROPHOTOSENSITIVE MEMBER USING SAME

[75] Inventors: Kazushi Iuchi; Hideyuki Takai; Hajime Miyazaki; Itaru Yamazaki, all of Yokohama, Japan

[73] Assignee: Canon Kabushiki Kaisha, Tokyo, Japan

[21] Appl. No.: 555,038

[22] Filed: Jul. 20, 1990

[30] Foreign Application Priority Data

Jul. 21, 1989 [JP] Japan .................................. 1-189200

[51] Int. Cl.$^5$ ......................... G03G 5/06; G09B 67/50
[52] U.S. Cl. ......................................... 430/76; 430/78; 430/135; 540/141
[58] Field of Search ..................... 430/76, 58, 59, 78; 540/141

[56] References Cited

U.S. PATENT DOCUMENTS

| | | | |
|---|---|---|---|
| 4,444,861 | 4/1984 | Fujimaki et al. | 430/58 |
| 4,664,997 | 5/1987 | Nogami et al. | 430/58 |
| 4,725,519 | 2/1988 | Suzuki et al. | 430/58 |
| 4,728,592 | 3/1988 | Ohaku et al. | 430/59 |
| 4,865,934 | 9/1989 | Ueda et al. | 430/78 |
| 4,898,799 | 2/1990 | Suzuki et al. | 430/59 |
| 4,994,339 | 2/1991 | Kinoshita et al. | 430/78 |

FOREIGN PATENT DOCUMENTS

| | | |
|---|---|---|
| 0082011 | 6/1983 | European Pat. Off. . |
| 0180930 | 5/1986 | European Pat. Off. . |
| 0180931 | 5/1986 | European Pat. Off. . |
| 3823363 | 1/1989 | Fed. Rep. of Germany . |
| 59-166959 | 9/1984 | Japan . |
| 63-365 | 1/1988 | Japan . |
| 63-366 | 1/1988 | Japan . |
| 63-116158 | 5/1988 | Japan . |
| 63-198067 | 8/1988 | Japan . |
| 1-17066 | 1/1989 | Japan . |

Primary Examiner—John Goodrow
Attorney, Agent, or Firm—Fitzpatrick, Cella, Harper & Scinto

[57] ABSTRACT

Oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays. The oxytitanium phthalocyanine crystal provides an electrophotosensitive member showing a high and stable photosensitivity for long-wavelength light as well as a stable chargeability even after photoirradiation.

14 Claims, 18 Drawing Sheets

001100110011# OXYTITANIUM PHTHALOCYANINE, PROCESS FOR PRODUCING SAME AND ELECTROPHOTOSENSITIVE MEMBER USING SAME

FIELD OF THE INVENTION AND RELATED ART

The present invention relates to oxytitanium phthalocyanine having a novel crystal form, a process for producing the oxytitanium phthalocyanine and an electrophotosensitive member using the oxytitanium phthalocyanine.

Hitherto, phthalocyanine pigments have been watched and studied for electronic materials used for electrophotosensitive members, solar cells, sensors, etc. in addition to colorants.

At present, non-impact type printers utilizing electrophotography have been popularized as terminal printers instead of the conventional impact type printers. These printers are laser beam printers using lasers as light sources in general. As the light sources, semiconductor lasers are used in view of cost, apparatus size, etc. The semiconductor lasers have long wavelengths (i.e., emission wavelengths: 790±20 nm), so that electrophotosensitive members having sufficient sensitivity for laser light having the long wavelengths have been developed. The sensitivity of an electrophotosensitive member varies depending on a species of a charge-generating material.

There have been studied many charge-generating materials having sensitivity for long-wavelength light, which include metallic phthalocyanine compounds such as chloro-aluminum phthalocyanine, chloro-indium phthalocyanine, oxyvanadium phthalocyanine, chloro-gallium phthalocyanine, magnesium phthalocyanine and oxytitanium phthalocyanine; and non-metallic phthalocyanine compounds.

For many phthalocyanine compounds among these, various crystal forms have been known. It is generally known, for example, that non-metallic phthalocyanine compounds of $\alpha$-type, $\beta$-type, $\gamma$-type, $\delta$-type, $\epsilon$-type, $\chi$-type, $\tau$-type, etc. and copper phthalocyanine of $\alpha$-type, $\beta$-type, $\gamma$-type, $\delta$-type, $\epsilon$-type, $\chi$-type, etc. exist. Further, it is also generally known that the difference in crystal form exerts great influence on electrophotographic characteristics (i.e., sensitivity, potential stability in durability test, etc.) and paint characteristics when the phthalocyanine compounds are used in paint.

Many different crystal forms of oxytitanium phthalocyanine having high sensitivity for the long-wavelength light in particular have been known similarly as in the above non-metallic phthalocyanine compounds and copper phthalocyanine, including those disclosed in Japanese Laid-Open Patent Application (KOKAI) Nos. 49544/1984 (U.S. Pat. No. 4,444,861), 166959/1984, 239248/1986 (U.S. Pat. No. 4,728,592), 67094/1987 (U.S. Pat. No. 4,664,997), 366/1988, 116158/1988, 198067/1988 and 17066/1989.

SUMMARY OF THE INVENTION

An object of the present invention is to provide oxytitanium phthalocyanine having a novel crystal form and a process for producing the oxytitanium phthalocyanine.

Another object of the present invention is to provide an oxytitanium phthalocyanine crystal which is excellent in solvent stability and a process for producing the oxytitanium phthalocyanine crystal.

Another object of the present invention is to provide an electrophotosensitive member having high photosensitivity for long-wavelength light.

A further object of the present invention is to provide an electrophotosensitive member which has excellent stability of electric potential and maintains good images when used in a durability test.

A still further object of the present invention is to provide an electrophotosensitive member having a good photomemory characteristic (a charging characteristic after irradiation with visible rays for a long time).

According to the present invention, there is provided oxytitanium phthalocyanine having a novel crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays.

According to the present invention, there is further provided a process for producing oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays, wherein amorphous oxytitanium phthalocyanine is treated with methanol and then is subjected to milling with a solvent selected from the group consisting of ether, monoterpene hydrocarbons, and liquid paraffin.

According to the present invention, there is also provided an electrophotosensitive member comprising an electroconductive support and a photosensitive layer formed thereon, wherein the photosensitive layer comprises oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
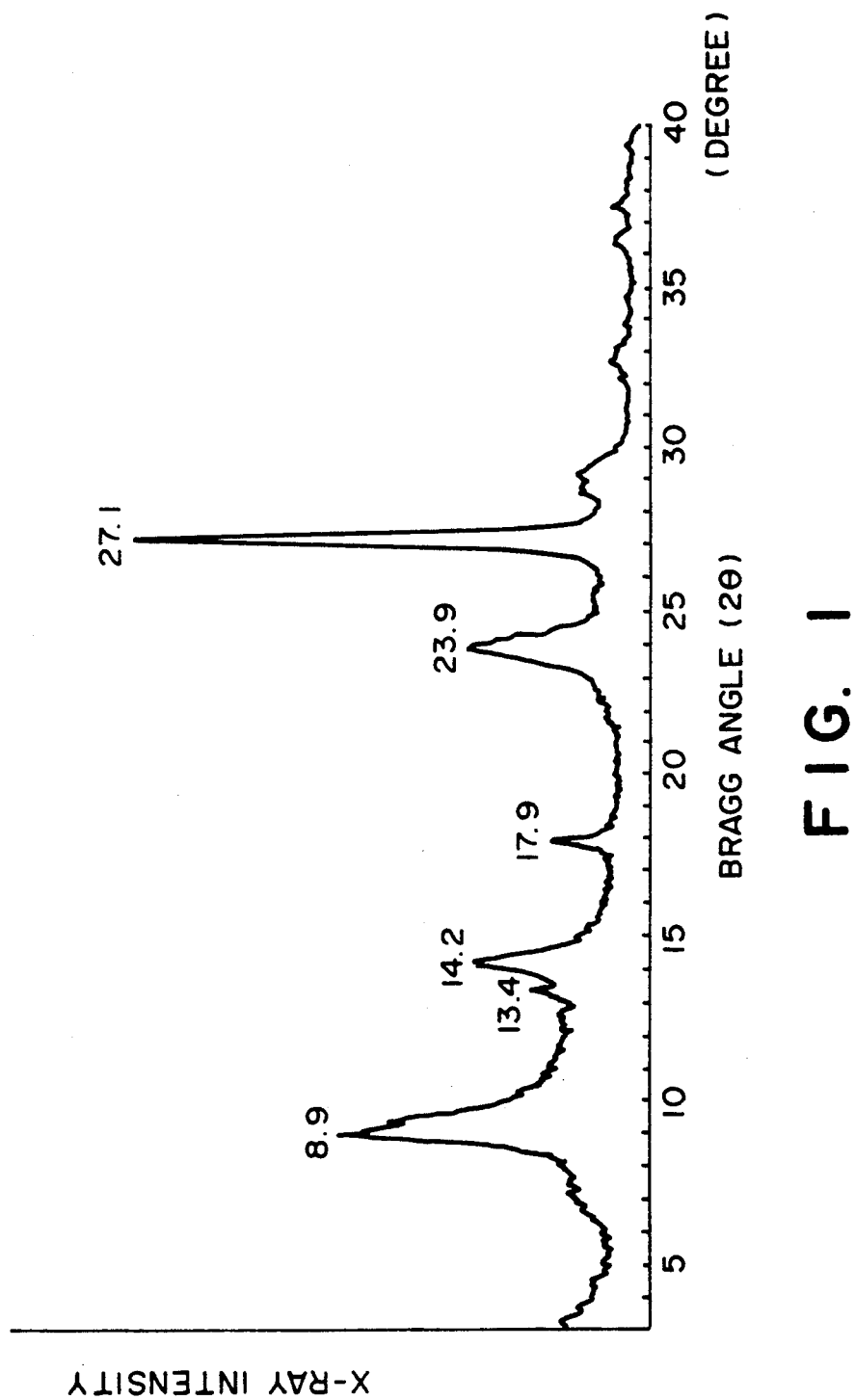
FIGS. 1-3 are graphs showing X-ray diffraction patterns of three types of oxytitanium phthalocyanine having a crystal form of the invention each prepared in Synthesis Examples 1-3.
Figure 2:
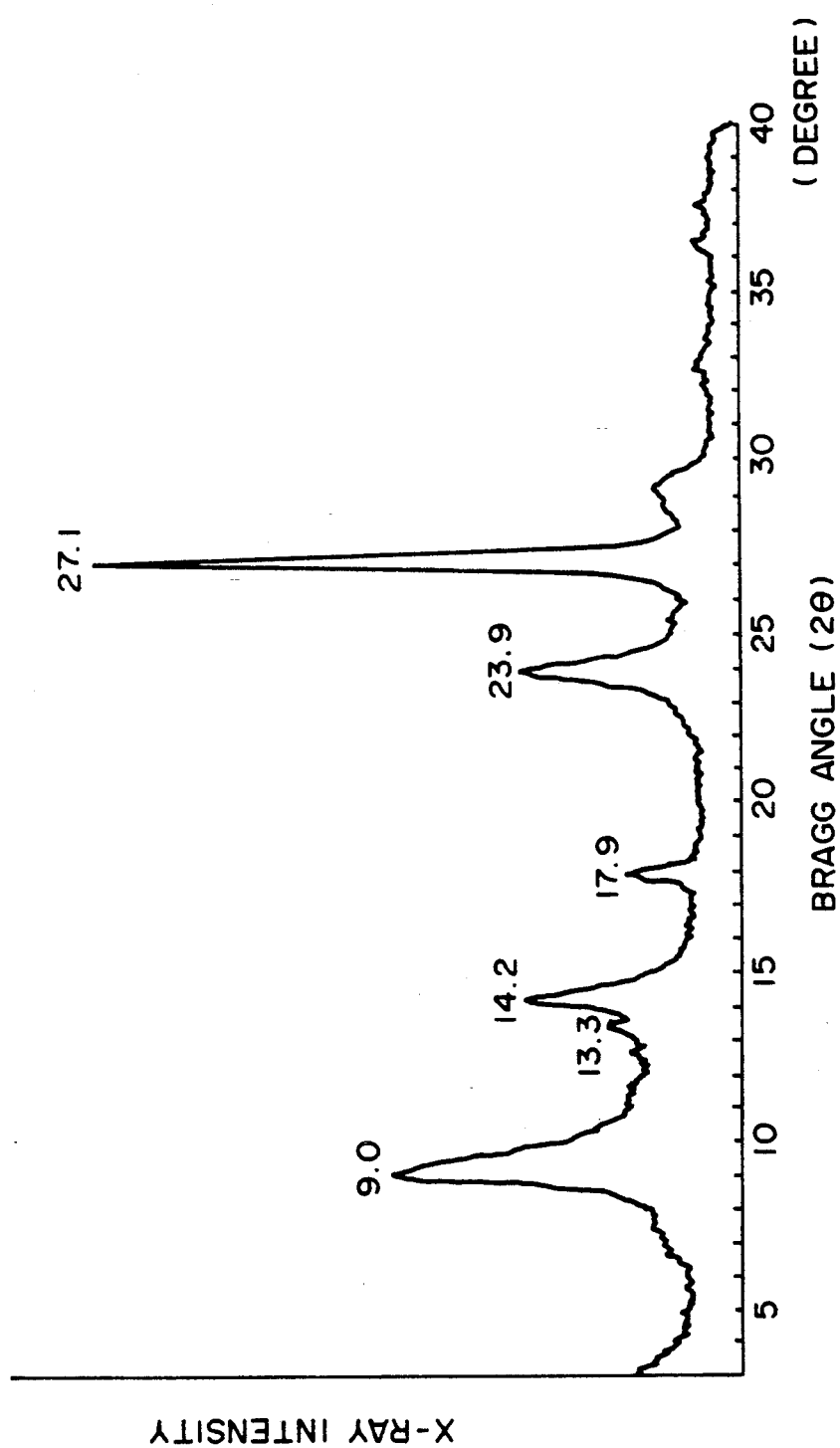
Figure 3:
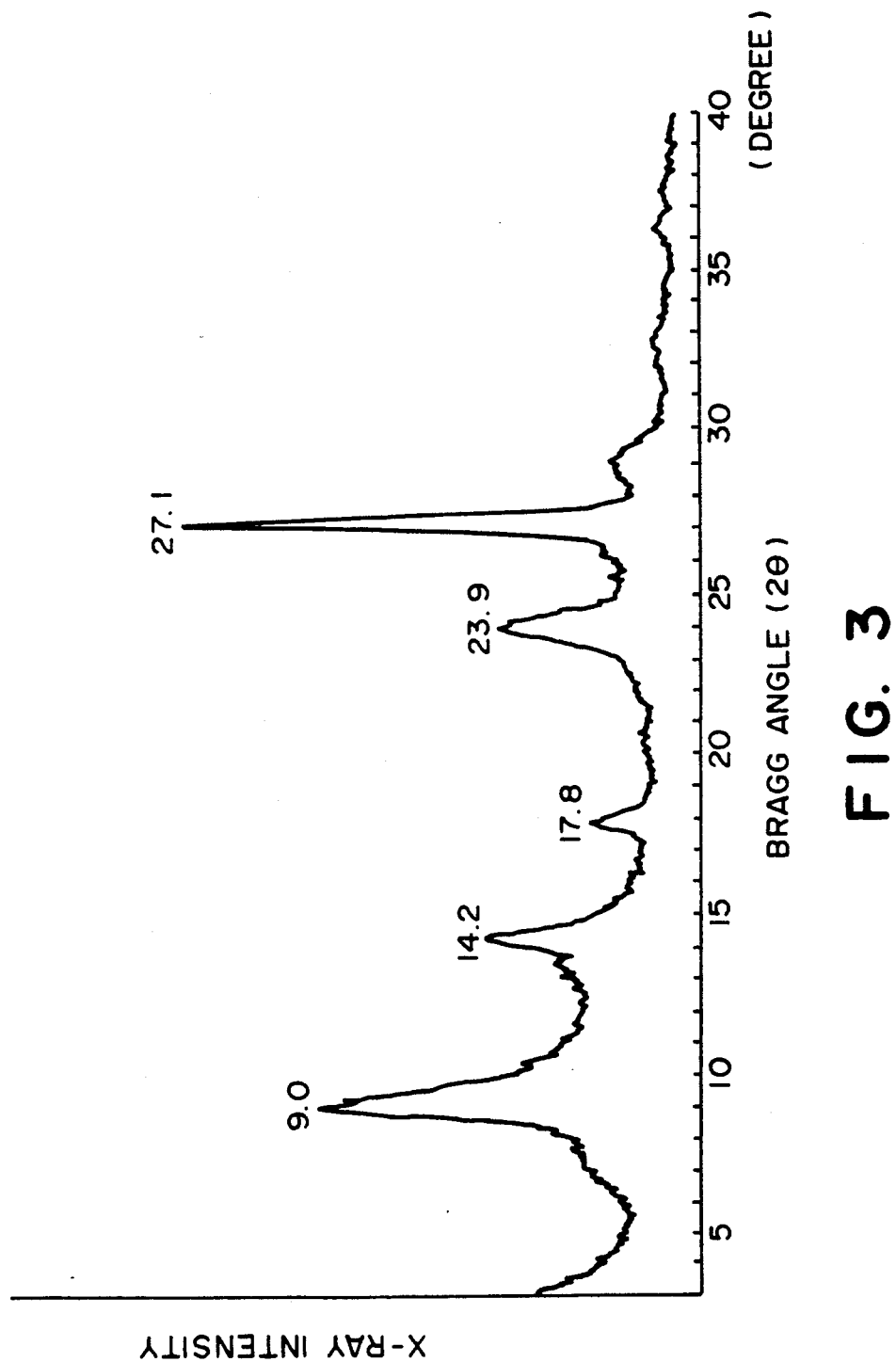

In X-ray diffraction patterns of three types of oxytitanium phthalocyanine of the invention as shown in FIGS. 1-3, strong peaks are observed at specific Bragg angles ($2\theta \pm 0.2$ degree) of 9.0 degrees, 14.2 degrees, 23.9 degrees and 27.1 degrees. The above peaks are selected in order of peak intensity by taking the highest four peaks as main peaks.

Referring to FIGS. 1-3, among the above four peaks, the peak of 27.1 degrees is the first strongest peak and the peak of 9.0 degrees is the second strongest peak. The above four peaks are followed by the peaks of 17.9 degrees and 13.3 degrees. Further, there are no clear peaks observed in the range of 10.5-13.0 degrees, 14.8-17.4 degrees or 18.2-23.2 degrees.

The shapes of the peaks in the X-ray diffraction pattern of the invention can be slightly changed depending on the production or measuring conditions, so the tip of each peak can split. In FIG. 1, the peak of 8.9 degrees appears to split into two peaks of 8.9 degrees and about 9.4 degrees, and the peak of 14.2 degrees also appears to split into two peaks of 14.2 degrees and about 14.1 degrees.

The structural formula of oxytitanium phthalocyanine according to the present invention is represented by the following formula:

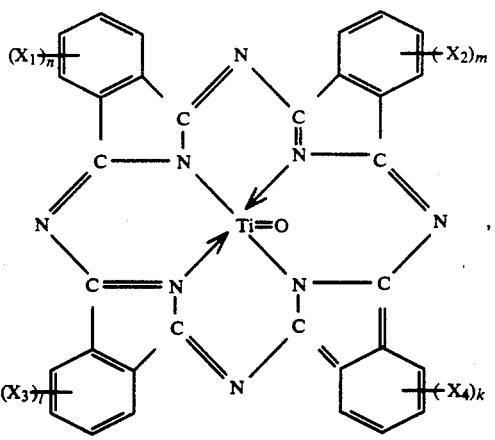

wherein $X_1$, $X_2$, $X_3$ and $X_4$ respectively denote Cl or Br; and n, m, l and k are respectively an integer of 0-4.

A representative example of the process for producing oxytitanium phthalocyanine having a specific crystal form of the invention is described below.

Titanium tetrachloride is reacted with o-phthalodinitrile in $\alpha$-chloronaphthalene to provide dichlorotitanium phthalocyanine. The resultant dichlorotitanium phthalocyanine is washed with a solvent such as $\alpha$-chloronaphthalene, trichlorobenzene, dichlorobenzene, N-methylpyrrolidone or N,N-dimethylformamide and is further washed with a solvent such as methanol or ethanol, followed by hydrolysis with hot water to obtain an oxytitanium phthalocyanine crystal. The resultant crystal comprises a mixture of various crystal forms in most cases. According to the present invention, the resultant crystal is treated by acid pasting (i.e., a method of dissolving the mixture in acid (e.g., sulfuric acid) and pouring the resultant solution into water to reprecipitate a solid in the form of a paste), whereby the resultant crystal is once converted into amorphous oxytitanium phthalocyanine. The resultant amorphous oxytitanium phthalocyanine is subjected to methanol treatment for 30 minutes or more, preferably 1 hour or more, at room temperature or under heating or boiling, followed by drying under reduced pressure. The treated oxytitanium phthalocyanine is subjected to milling for 5 hours or more, preferably 10 hours or more, with a solvent, as a dispersion medium, selected from: ethers, such as n-propyl ether, n-butyl ether, isobutyl ether, sec-butyl ether, n-amyl ether, n-butyl methyl ether, n-butyl ethyl ether or ethylene glycol n-butyl ether; monoterpene hydrocarbons, such as terpinolene or pinene; and liquid paraffins, to provide oxytitanium phthalocyanine having a specific crystal form of the present invention.

In the above process, the methanol treatment may for example be performed by treating the amorphous oxytitanium phthalocyanine in the form of a dispersion in methanol under stirring, and the milling may be performed by using a milling device such as a sand mill or a ball mill with milling media such as glass beads, steel beads or alumina balls.

The resultant oxytitanium phthalocyanine of the invention functions as an excellent photoconductor and may be adapted for an electronic material such as an electrophotosensitive member, a solar cell, a sensor or a switching device.

Hereinafter, some examples of application of the oxytitanium phthalocyanine crystal of the invention to a charge-generating material in an electrophotosensitive member will be explained.

Figure 4:
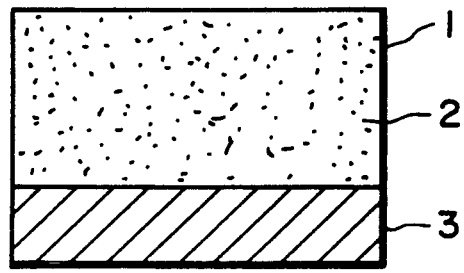
FIGS. 4 and 5 are schematic sectional views of laminar structure of electrophotosensitive members.
Figure 5:
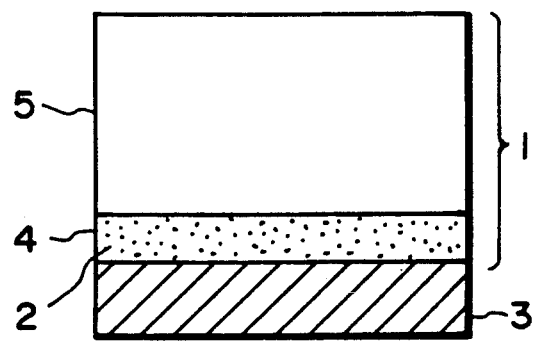

Representative embodiments of laminar structure of the electrophotosensitive member of the invention as shown in FIGS. 4 and 5.

FIG. 4 shows an embodiment, wherein a photosensitive layer 1 is composed of a single layer and comprises a charge-generating material 2 and a charge-transporting material (not shown) together. The photosensitive layer 1 may be disposed on an electroconductive support 3.

FIG. 5 shows an embodiment of laminated structure wherein a photosensitive layer 1 comprises a charge generation layer 4 comprising a charge-generating material 2 and a charge transport layer 5 comprising a charge-transporting material (not shown) disposed on the charge generation layer 4; and the charge transport layer 5 may be disposed on an electroconductive support 3. The charge generation layer 4 and the charge transport layer 5 can be disposed in reverse.

In production of the electrophotosensitive member, the electroconductive support 3 may be a material having an electroconductivity including: a metal such as aluminum or stainless steel; and metal, plastic or paper having an electroconductive layer.

Between the electroconductive support 3 and the photosensitive layer 1, there can be formed a primer or undercoat layer having a barrier function and an adhesive function as an intermediate layer. The primer layer may comprise a substance, such as polyvinyl alcohol, polyethylene oxide, ethyl cellulose, methyl cellulose, casein, polyamide, glue or gelatin. The above substance may be dissolved in an appropriate solvent and applied onto the electroconductive support 3 to prepare the primer layer. The thickness of the primer layer may be 0.2–3.0 microns.

The photosensitive layer which is composed of a single layer as shown in FIG. 4 may be formed by mixing the charge-generating material comprising the oxytitanium phthalocyanine crystal of the invention and the charge-transporting material with an appropriate solution containing a binder resin, applying the resultant coating liquid and then drying the coating.

The charge generation layer of the photosensitive layer having a laminated structure as shown in FIG. 5 may be formed by dispersing the charge-generating material comprising the oxytitanium phthalocyanine crystal of the invention in an appropriate solution containing a binder resin, applying the resultant coating liquid and then drying the coating. It is possible not to use the binder resin in the above solution. The charge generation layer may also be formed by vapor deposition. Examples of the binder resin as described above may include: polyester, acrylic resins, polyvinylcarbazole, phenoxy resins, polycarbonate, polyvinyl butyral, polystyrene, vinyl acetate resins, polysulfone, polyarylate or vinylidene chloride-acrylonitrile copolymers.

The charge transport layer may be formed by dissolving a charge-transporting material and a binder resin in an appropriate solvent, applying the resultant coating liquid and then drying the coating. Examples of the charge-transporting material used may include: triaryl amine compounds, hydrazone compounds, stilbene compounds, pyrazoline compounds, oxazole compounds, thiazole compounds or triaryl methane compounds. As the binder resin, the above-mentioned resins can be used.

The method for applying the photosensitive layer(s) may be: dipping, spray coating, spinner coating, bead coating, blade coating or beam coating.

In formulating the photosensitive layer, when the photosensitive layer is composed of a single layer, the charge-generating material and the charge-transporting material may preferably be contained in the photosensitive layer in amounts of 2–20 wt. % and 30–80 wt. %, respectively, particularly 2–10 wt. % and 40–70 wt. %, respectively. When the photosensitive layer has a laminated structure, the charge-generating material may preferably be contained in the charge generation layer in an amount of 20–80 wt. %, particularly 50–70 wt. %, and the charge-transporting material may preferably be contained in the charge transport layer in an amount of 30–70 wt. particularly 40–60 wt. %.

The thickness of the photosensitive layer which is composed of a single layer may preferably be 5–40 microns, more preferably 10–30 microns. When the photosensitive layer has a laminated structure, the thickness of the charge generation layer may preferably be 0.01–10 microns, more preferably 0.05–5 microns and the thickness of the charge transport layer may preferably be 5–40 microns, more preferably 10–30 microns.

In order to protect the photosensitive layer from external shock, a thin protective layer can be further disposed on the photosensitive layer.

When the oxytitanium phthalocyanine crystal of the invention is used as the charge-generating material, it is possible to mix the oxytitanium phthalocyanine crystal with another charge-generating material or the charge-transporting material as desired.

The electrophotosensitive member according to the present invention can be applied to not only a laser beam printer, a light-emitting diode (LED) printer and a cathode-ray tube (CRT) printer but also an ordinary electrophotographic copying machine and other applicable fields of electrophotography.

Figure 20:
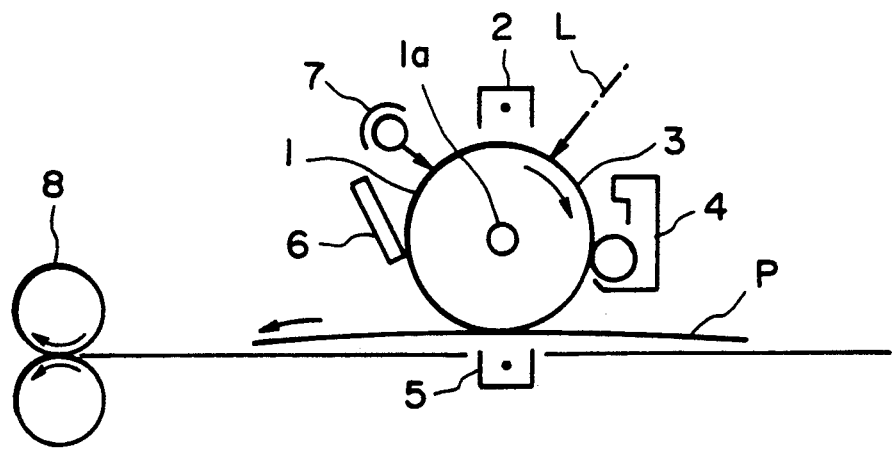
FIG. 20 is a schematic structural view of an electrophotographic apparatus using an electrophotosensitive member of the invention.

FIG. 20 shows a schematic structural view of an ordinary transfer-type electrophotographic apparatus using an electrophotosensitive member of the invention. Referring to FIG. 20, a photosensitive drum (i.e., photosensitive member) 1 as an image-carrying member is rotated about an axis 1a at a prescribed peripheral speed in the direction of the arrow shown inside of the photosensitive drum 1. The surface of the photosensitive drum is uniformly charged by means of a charger 2 to have a prescribed positive or negative potential. The photosensitive drum 1 is exposed to light-image L (as by slit exposure or laser beam-scanning exposure) by using an image exposure means (not shown), whereby an electrostatic latent image corresponding to an exposure image is successively formed on the surface of the photosensitive drum 1. The electrostatic latent image is developed by a developing means 4 to form a toner image. The toner image is successively transferred to a transfer material P which is supplied from a supply part (not shown) to a position between the photosensitive drum 1 and a transfer charger 5 in synchronism with the rotating speed of the photosensitive drum 1, by means of the transfer charger 5. The transfer material P with the toner image thereon is separated from the photosensitive drum 1 to be conveyed to a fixing device 8, followed by image fixing to print out the transfer material P as a copy outside the electrophotographic apparatus.

Residual toner particles on the surface of the photosensitive drum 1 after the transfer are removed by means of a cleaner 6 to provide a cleaned surface, and residual charge on the surface of the photosensitive drum 1 is erased by a pre-exposure means 7 to prepare for the next cycle. As the charger 2 for charging the photosensitive drum 1 uniformly, a corona charger is widely used in general. As the transfer charger 5, such a corona charger is also widely used in general.

According to the present invention, in the electrophotographic apparatus, it is possible to provide a device unit which includes plural means inclusive of or selected from the photosensitive member (photosensitive drum), the charger, the developing means, the cleaner, etc. so as to be attached or removed as desired. The device unit may, for example, be composed of the photosensitive member and at least one device of the charger, the developing means and the cleaner to prepare a single unit capable of being attached to or removed from the body of the electrophotographic apparatus by using a guiding means such as a rail in the body. The device unit can be accompanied with the charger and/or the developing means to prepare a single unit.

In a case where the electrophotographic apparatus is used as a copying machine or a printer, exposure light-image L may be given by reading data on reflection light or transmitted light from an original or on the original, converting the data into a signal and then effecting a laser beam scanning, a drive of LED array or a drive of a liquid crystal shutter array.

Figure 21:
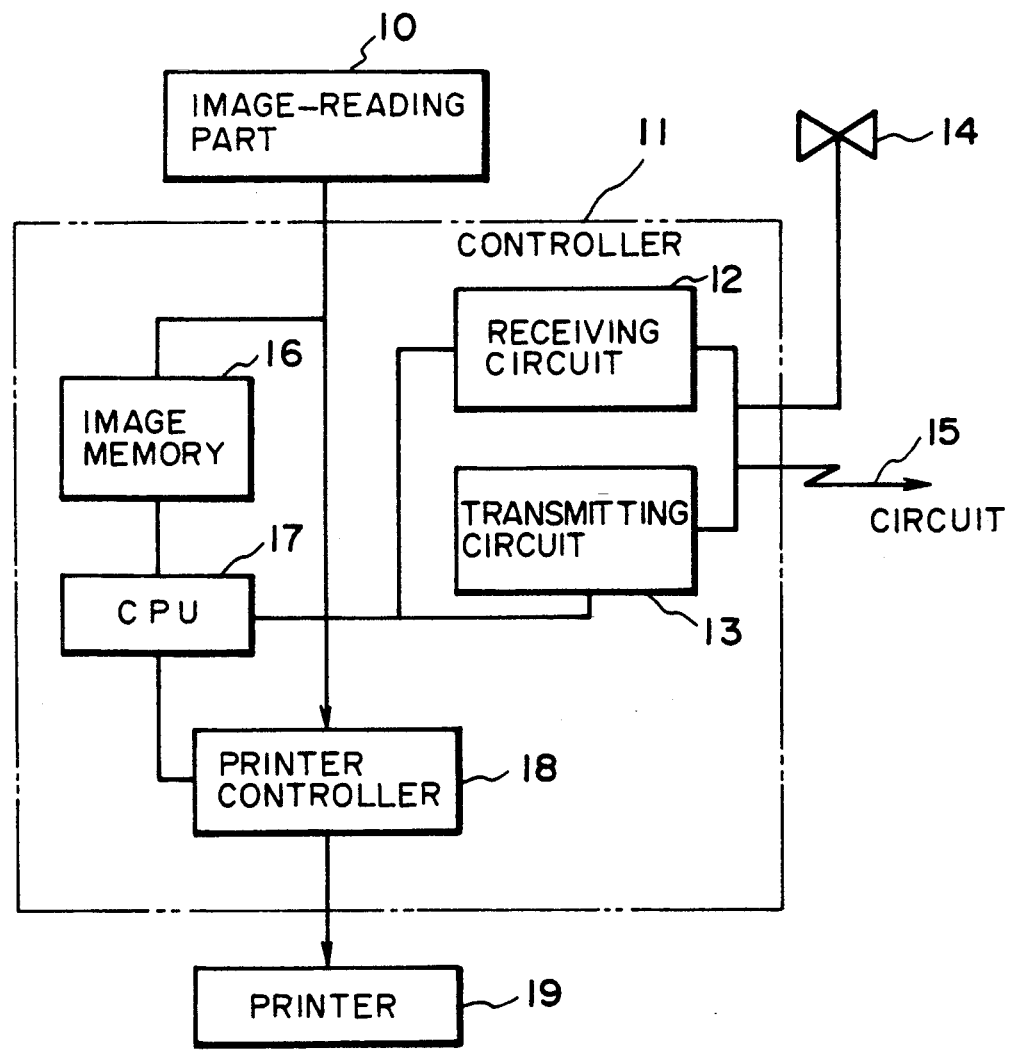
FIG. 21 is a block diagram of a facsimile machine using an electrophotographic apparatus using an electrophotosensitive member of the invention as a printer.

In a case where the electrophotographic apparatus according to the present invention is used as a printer of a facsimile machine, exposure light-image L is given by exposure for printing received data. FIG. 21 shows a block diagram of an embodiment for explaining this case. Referring to FIG. 21, a controller 11 controls an image-reading part 10 and a printer 19. The whole controller 11 is controlled by a CPU (central processing unit) 17. Read data from the image-reading part is transmitted to a partner station through a transmitting circuit 13, and on the other hand, the received data from the partner station is sent to the printer 19 through a receiving circuit 12. An image memory memorizes prescribed image data. A printer controller 18 controls the printer 19, and a reference numeral 14 denotes a telephone.

The image received through a circuit 15 (the image data sent through the circuit from a connected remote terminal) is demodulated by means of the receiving circuit 12 and successively stored in an image memory 16 after a restoring-signal processing of the image data. When image for at least one page is stored in the image memory 16, image recording of the page is effected. The CPU 17 reads out the image data for one page from the image memory 16 and sends the image data for one page subjected to the restoring-signal processing to the printer controller 18. The printer controller 18 receives the image data for one page from the CPU 17 and controls the printer 19 in order to effect image-data recording. Further, the CPU 17 is caused to receive image for a subsequent page during the recording by the printer 19. As described above, the receiving and recording of the image are performed.

Synthesis examples of oxytitanium phthalocyanine crystal according to the present invention will be explained hereinbelow.

SYNTHESIS EXAMPLE 1

In 100 g of α-chloronaphthalene, 5.0 g of o-phthalodinitrile and 2.0 g of titanium tetrachloride were stirred for 3 hours at 200° C., followed by cooling to 50° C. to precipitate a crystal. The crystal was recovered by filtration to obtain a paste of dichlorotitanium phthalocyanine, followed by washing with 100 ml of N,N-dimethylformamide at 100° C. under stirring and two times of washing with 100 ml of methanol at 60° C. The resultant paste was recovered by filtration and stirred in 100 ml of deionized water for 1 hour at 80° C., followed by filtration to obtain 4.3 g of a blue oxytitanium phthalocyanine crystal. The results of elementary analysis are shown below.

Elementary analysis ($C_{32}H_{16}N_8OTi$)

|  | C (%) | H (%) | N (%) | Cl (%) |
| --- | --- | --- | --- | --- |
| Calculated value | 66.68 | 2.80 | 19.44 | 0.00 |
| Observed value | 66.50 | 2.99 | 19.42 | 0.47 |

Figure 6:
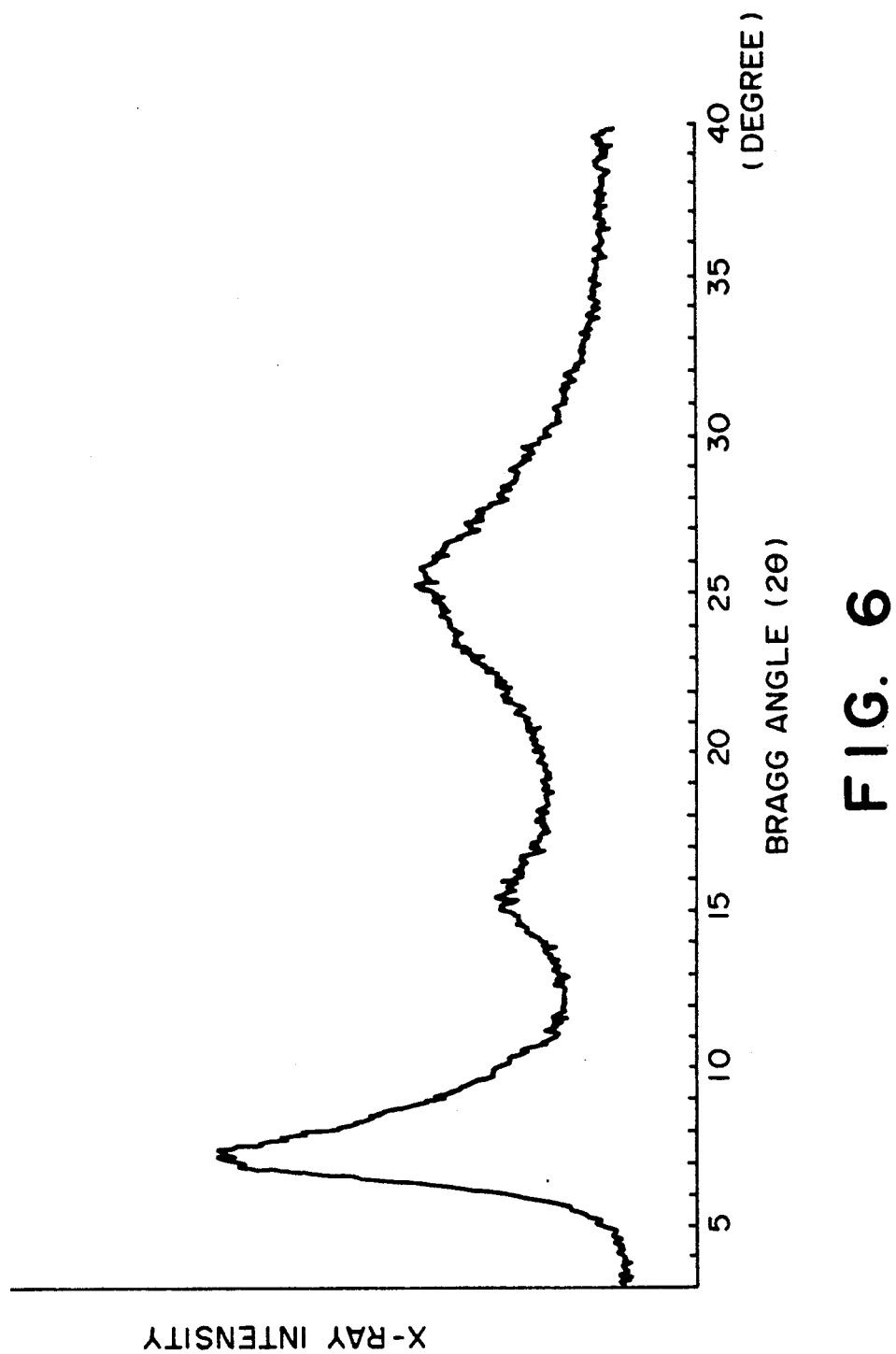
FIG. 6 is a graph showing an X-ray diffraction pattern of amorphous oxytitanium phthalocyanine.
Figure 7:
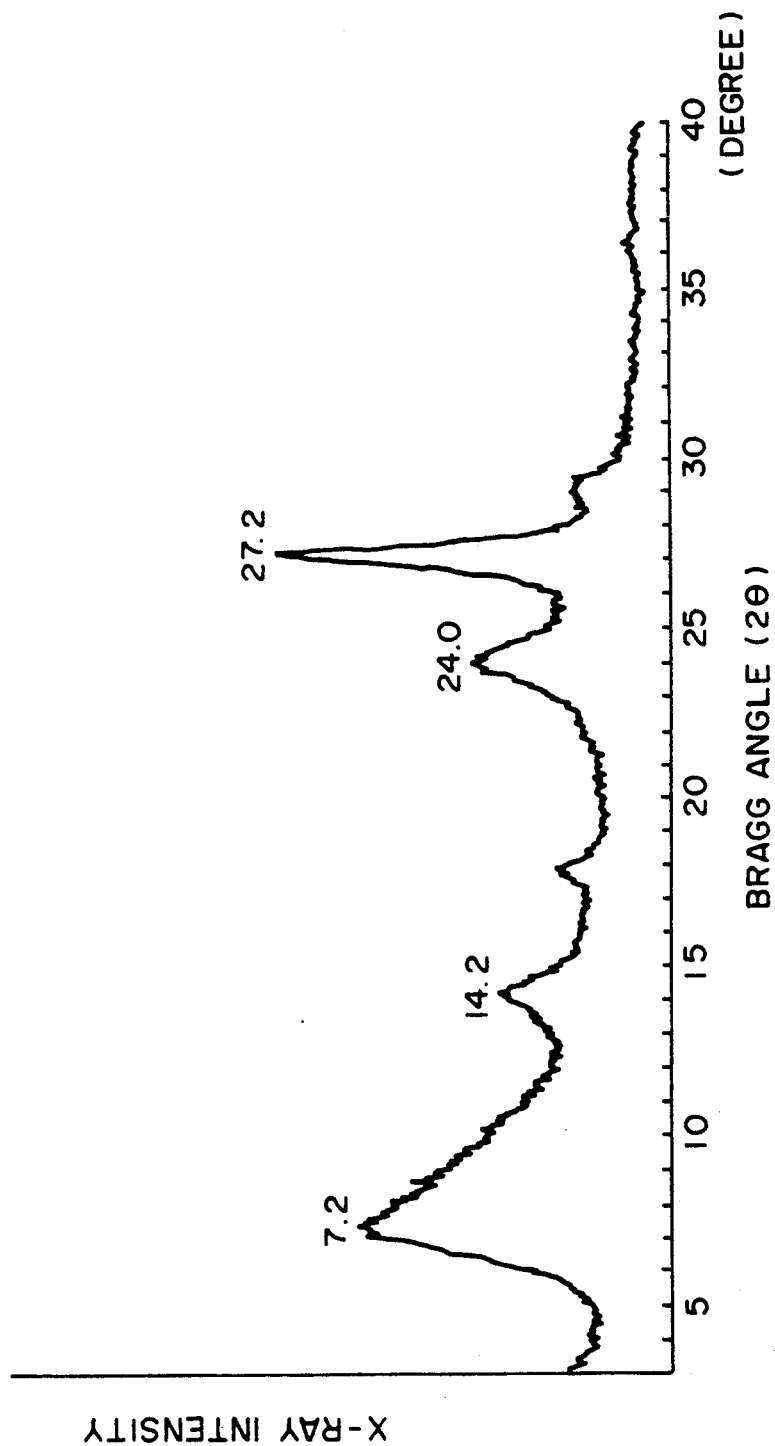
FIG. 7 shows an X-ray diffraction pattern of low-crystalline oxytitanium phthalocyanine prepared by treating with methanol.
Figure 8:
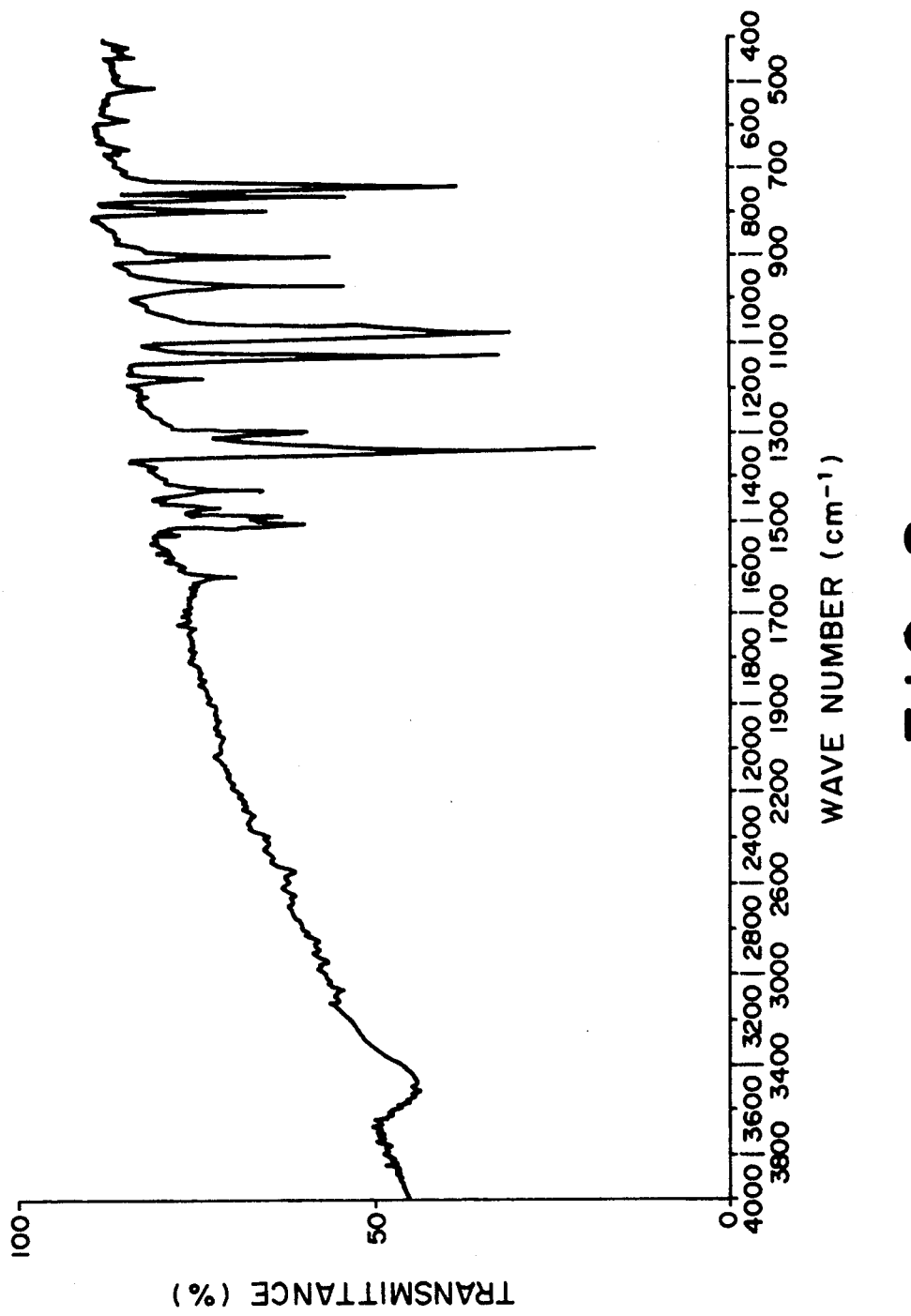
FIG. 8 shows an infrared absorption spectrum (KBr method) of oxytitanium phthalocyanine having a crystal form of the invention.
Figure 9:
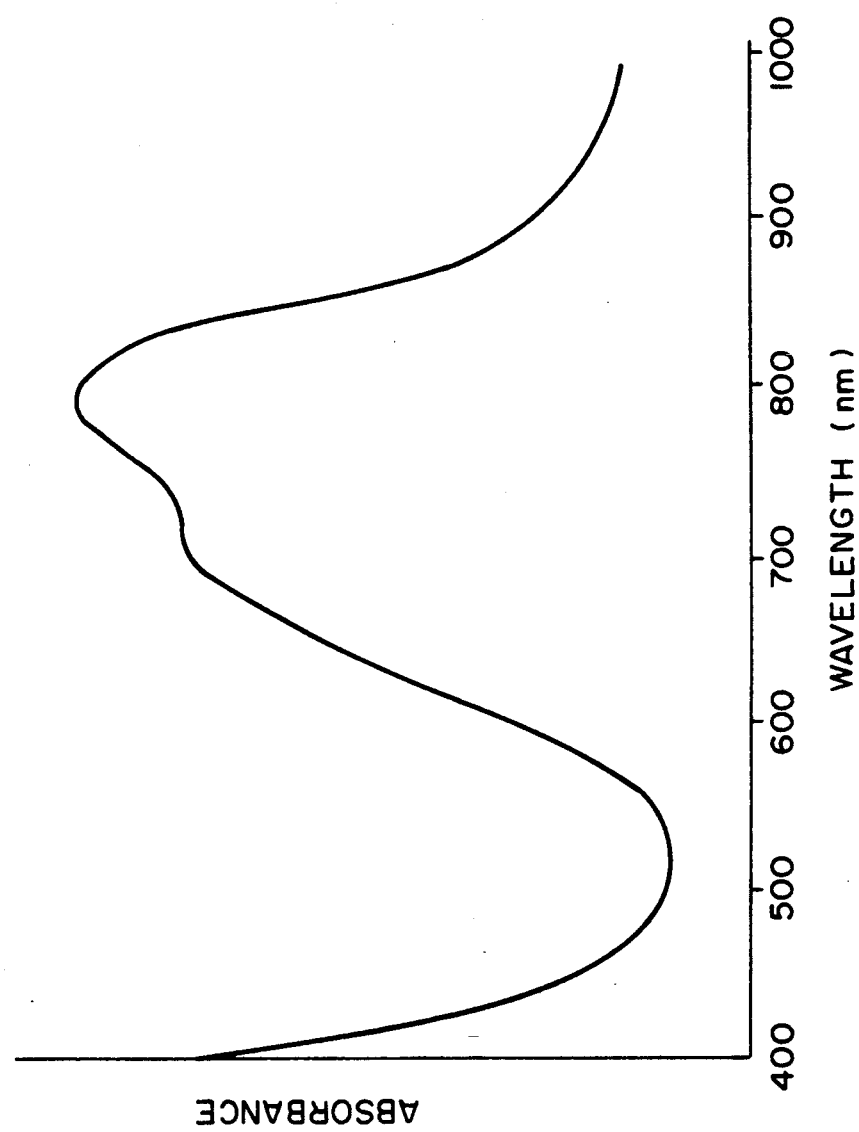
FIG. 9 shows an ultraviolet absorption spectrum of oxytitanium phthalocyanine having a crystal form of the invention.

The resultant oxytitanium phthalocyanine crystal was dissolved in 150 g of concentrated sulfuric acid and then added dropwise to 1500 ml of deionized water at 20° C. under stirring to reprecipitate a crystal, followed by filtration and sufficient washing with water to obtain amorphous oxytitanium phthalocyanine. An X-ray diffraction pattern of the amorphous oxytitanium phthalocyanine is shown in FIG. 6. The resultant amorphous oxytitanium phthalocyanine in an amount of 4.0 g was subjected to stirring for suspension in 100 ml of methanol for 8 hours at room temperature (22° C.), followed by filtration and drying under reduced pressure to obtain low-crystallized oxytitanium phthalocyanine. An X-ray diffraction pattern of the low-crystallized oxytitanium phthalocyanine is shown in FIG. 7. To 2.0 g of the resultant low-crystallized oxytitanium phthalocyanine, 40 ml of n-butyl ether was added, followed by milling with glass beads in the size of 1 mm for 20 hours at room temperature (22° C.) to obtain a liquid dispersion. The solid was recovered from the dispersion, followed by washing with methanol, sufficient washing with water and drying to obtain 1.8 g of a novel oxytitanium phthalocyanine crystal of the invention. An X-ray diffraction pattern of the above-prepared oxytitanium phthalocyanine crystal of the invention is shown in FIG. 1. An infrared absorption spectrum measured by using a pellet of the above-prepared oxytitanium phthalocyanine crystal in mixture with KBr is shown in FIG. 8. An ultraviolet absorption spectrum measured by using a dispersion of the above-prepared oxytitanium phthalocyanine crystal in n-butyl ether is shown in FIG. 9.

SYNTHESIS EXAMPLE 2

50 ml of pinene was added to 2.0 g of methanol-treated oxytitanium phthalocyanine prepared in the same manner as in Synthesis Example 1, and then the mixture was milled with glass beads in the size of 1 mm for 20 hours at room temperature (22° C.) to obtain a dispersion. The solid was recovered from the dispersion, followed by washing with methanol, sufficient washing with water and drying to obtain 1.8 g of a novel oxytitanium phthalocyanine crystal of the invention. An X-ray diffraction pattern of the above-prepared oxytitanium phthalocyanine crystal is shown in FIG. 2.

SYNTHESIS EXAMPLE 3

Figure 10:
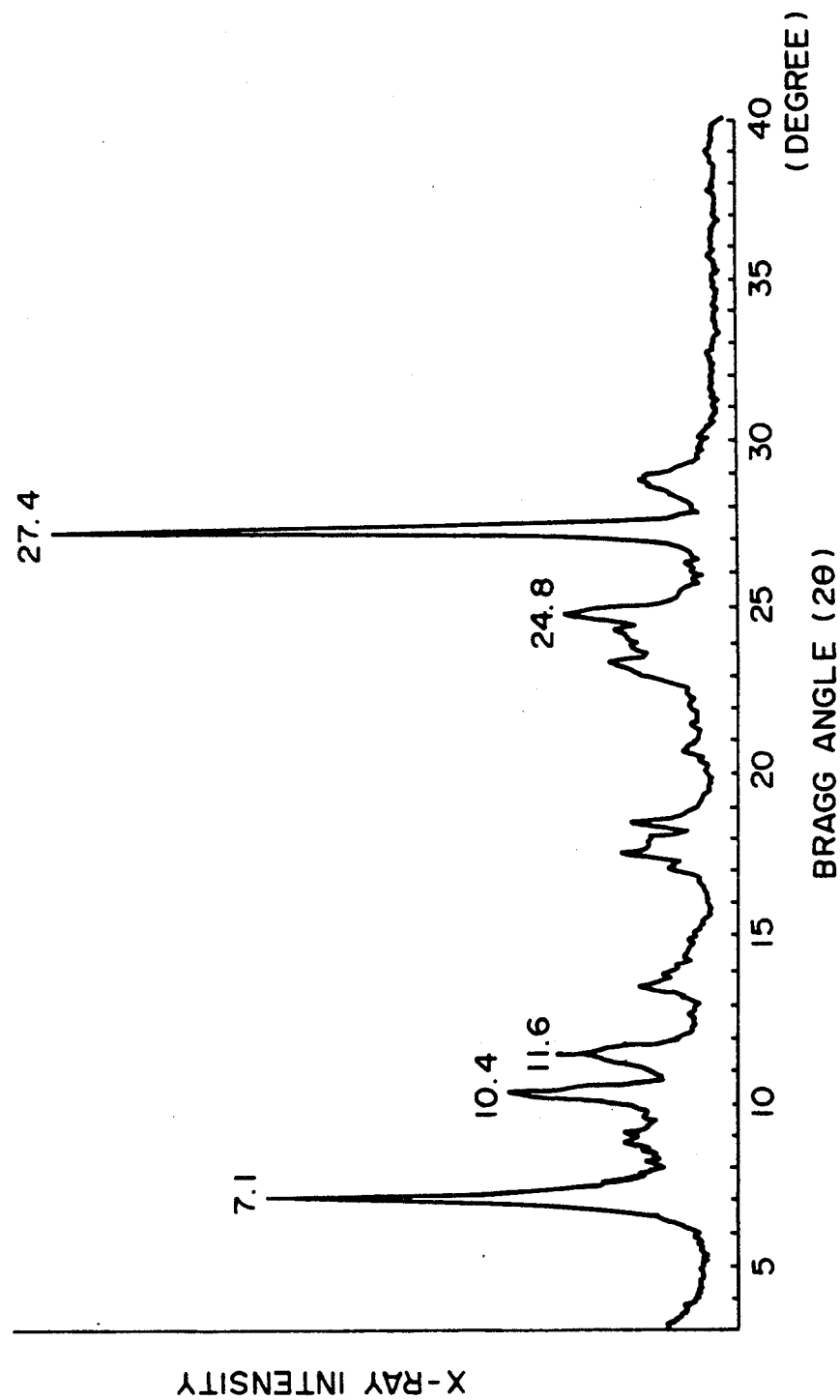
FIG. 10 shows an X-ray diffraction pattern of oxytitanium phthalocyanine having a crystal form prepared by treating with methanol in Synthesis Example 3.

To 4.0 g of amorphous oxytitanium phthalocyanine prepared in the same manner as in Synthesis Example 1, 100 ml of methanol was added, followed by boiling for 30 hours under suspension stirring. After the boiling treatment, the suspension was subjected to filtration and drying under reduced pressure to obtain 3.6 g of oxytitanium phthalocyanine. An X-ray diffraction pattern of the above oxytitanium phthalocyanine is shown in FIG. 10. To 2.0 g of the resultant oxytitanium phthalocyanine, 60 ml of ethylene glycol n-butyl ether was added, followed by milling with glass beads in the size of 1 mm for 15 hours at room temperature (22° C.) to obtain a dispersion. The solid was recovered from the dispersion, followed by washing with methanol, sufficient washing with water and drying to obtain 1.8 g of a novel oxytitanium phthalocyanine crystal of the invention. An X-ray diffraction pattern of the above-prepared oxytitanium phthalocyanine crystal is shown in FIG. 3.

COMPARATIVE SYNTHESIS EXAMPLE 1

Figure 11:
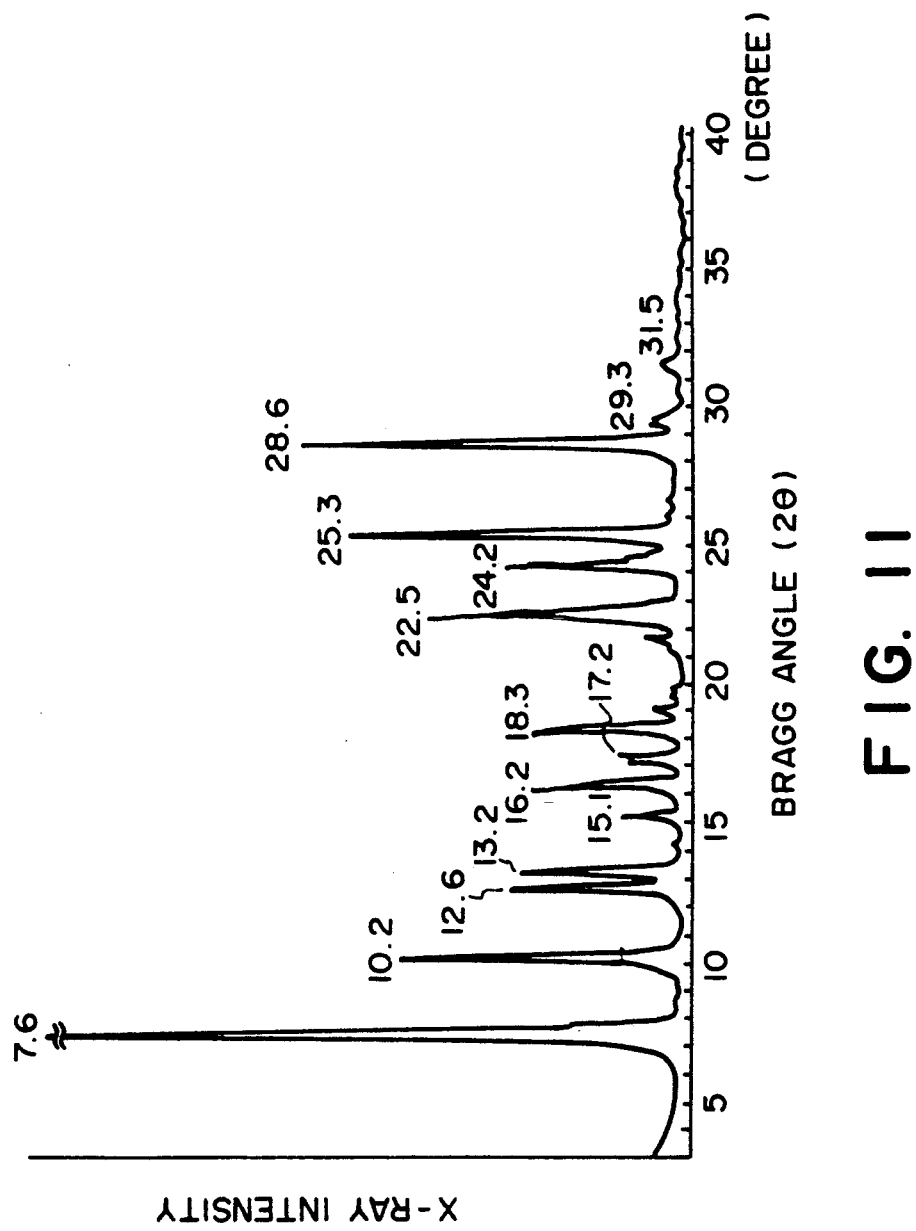
FIGS. 11-13 show X-ray diffraction patterns of three species of oxytitanium phthalocyanine prepared in Comparative Synthesis Examples 1-3, respectively.

A so-called α-type oxytitanium phthalocyanine crystal was synthesized in the same manner as disclosed in Japanese Laid-Open Patent Application (KOKAI) No. 239248/1986 (U.S. Pat. No. 4,728,592). The X-ray diffraction pattern is shown in FIG. 11.

COMPARATIVE SYNTHESIS EXAMPLE 2

Figure 12:
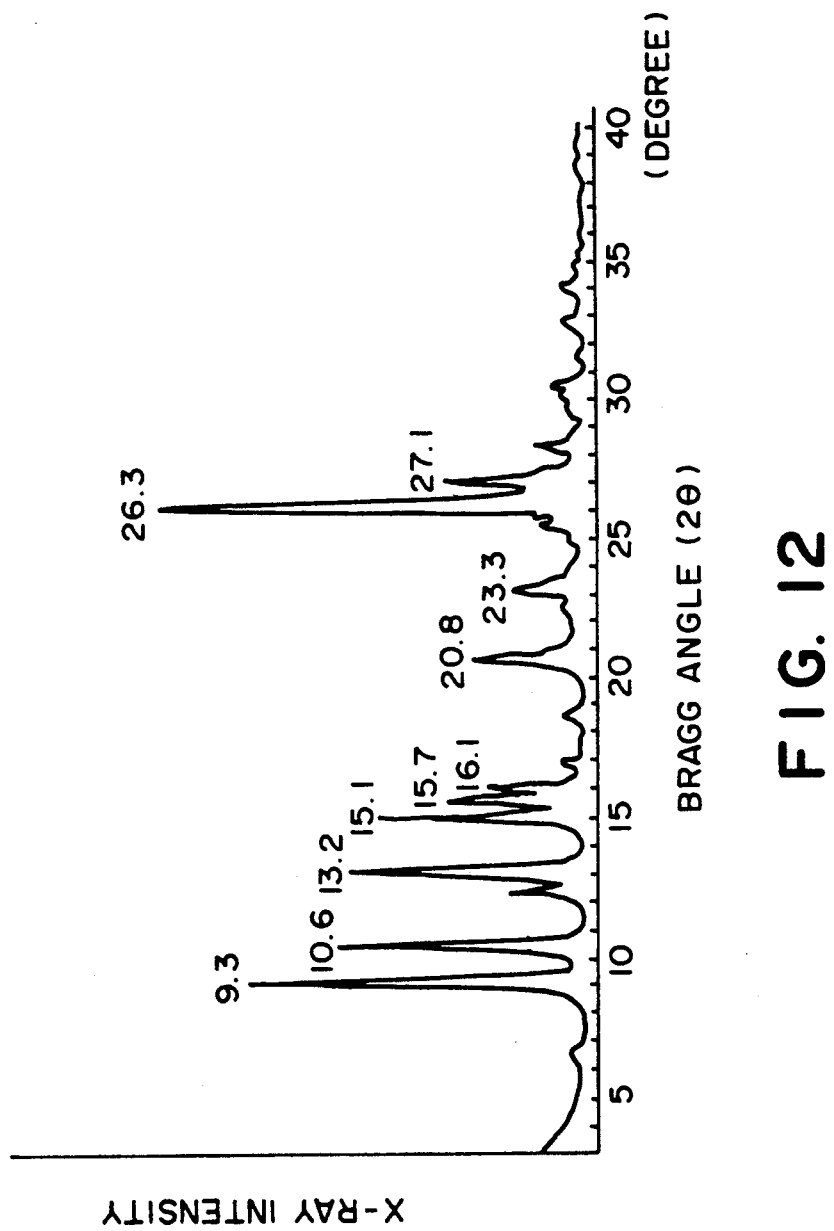

A so-called A-type oxytitanium phthalocyanine crystal was synthesized in the same manner as disclosed in Japanese Laid-Open Patent Application (KOKAI) No. 67094/1987 (U.S. Pat. No. 4,664,997). The X-ray diffraction pattern is shown in FIG. 12.

COMPARATIVE SYNTHESIS EXAMPLE 3

Figure 13:
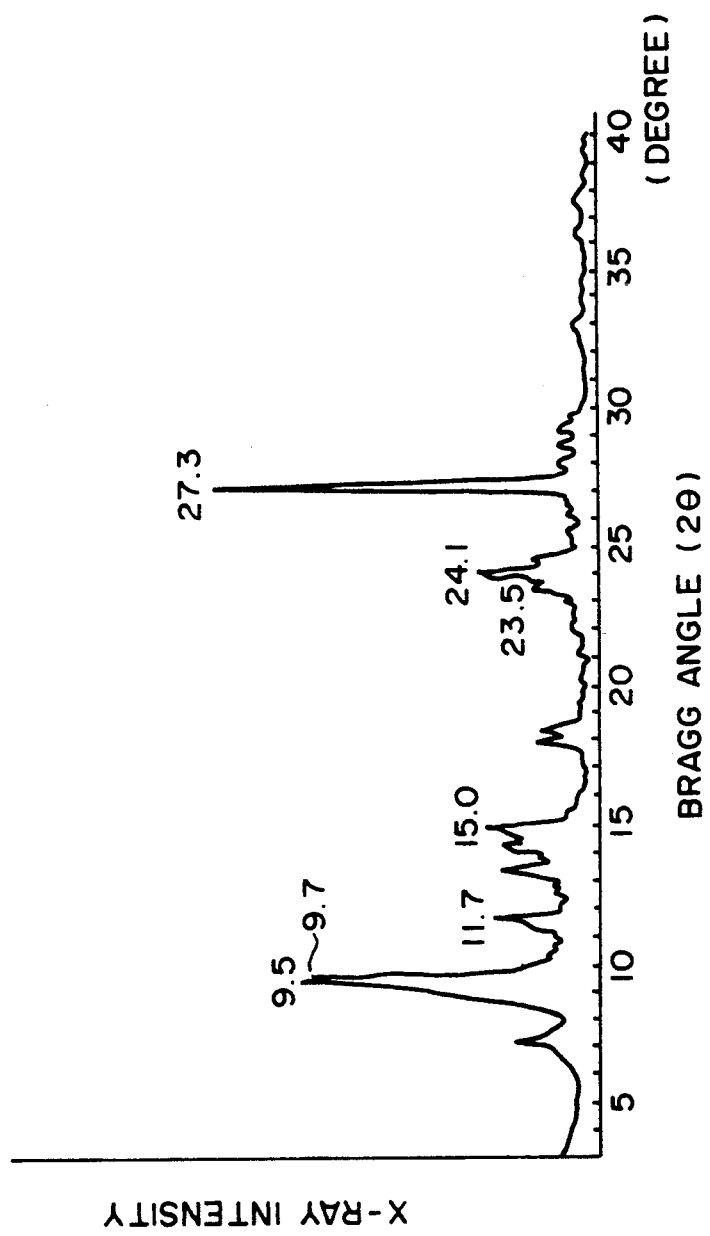

An oxytitanium phthalocyanine crystal was synthesized in the same manner as disclosed in Japanese Laid-Open Patent Application (KOKAI) No. 17066/1989. The X-ray diffraction pattern is shown in FIG. 13.

The conditions of the X-ray diffraction analysis using CuKα characteristic X-rays described above were as follows.
Measuring machine: X-ray diffraction apparatus manufactured by Rigaku Denki K. K. RAD-A system
X-ray tube (Target): Cu
Tube voltage: 50 KV
Tube current: 40 mA
Scanning method: 2θ/θ scan
Scanning speed: 2 deg./min.
Sampling width: 0.020 deg.
Starting angle (2θ): 3 deg.
Stopping angle (2θ): 40 deg.
Divergence slit: 0.5 deg.
Scattering slit: 0.5 deg.
Receiving slit: 0.3 mm
Curved monochromator: used.

Hereinbelow, examples of application of oxytitanium phthalocyanine crystals of the invention to electrophotosensitive members will be explained more specifically. Herein, a term "part(s)" denotes "weight part(s)".

EXAMPLE 1

50 parts of titanium oxide powder coated with tin oxide containing 10% antimony oxide, 25 parts of resol-type phenolic resin, 20 parts of methyl cellosolve, 5 parts of methanol and 0.002 part of silicone oil (polydimethylsiloxane-polyoxyalkylene copolymer, Mw (weight-average molecular weight)=3,000) were dispersed for 2 hours with 1 mm dia.-glass beads by means of a sand mill to prepare paint for forming an electroconductive layer. An aluminum cylinder (30 mm dia.×260 mm) was dipped in the above paint, followed by drying for 30 minutes at 140° C. to form a 20 micron-thick electroconductive layer. A solution of 5 parts of a polyamide (6-66-610-12 quaternary copolymer nylon) in a mixture solvent of 70 parts of methanol and 25 parts of butanol was applied onto the electroconductive layer by dipping, followed by drying to provide a 1 micron-thick primer layer. Four (4) parts of the oxytitanium phthalocyanine crystal prepared in Synthesis Example 1 and Two (2) parts of polyvinyl butyral (Mw=100,000–150,000) were dissolved in 100 ml of cyclohexanone, followed by dispersion of 1 hour with 1 mm dia.-glass beads by means of a sand mill. The resultant dispersion was diluted with 100 parts of methyl ethyl ketone to prepare a coating liquid. The coating liquid was applied onto the primary layer, followed by drying for 10 minutes at 80° C. to form a 0.15 micron-thick charge generation layer. Then, a solution was prepared by dissolving 10 parts of the charge-transporting material of the formula:

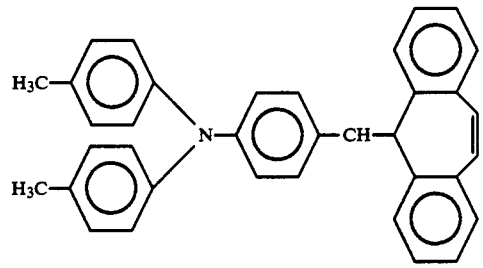

and 10 parts of a bisphenol Z-type polycarbonate resin (Mw=20,000) in 60 parts of monochlorobenzene and then applied onto the charge generation layer by dipping, followed by drying for 1 hour at 110° C. to form a 20 micron-thick charge transport layer, whereby an electrophotosensitive member was prepared.

COMPARATIVE EXAMPLE 1

An electrophotosensitive member was prepared in the same manner as in Example 1 except that the α-type oxytitanium phthalocyanine crystal prepared in Comparative Synthesis Example 1 was used.

COMPARATIVE EXAMPLE 2

An electrophotosensitive member was prepared in the same manner as in Example 1 except that the A-type oxytitanium phthalocyanine crystal prepared in Comparative Synthesis Example 2 was used.

COMPARATIVE EXAMPLE 3

An electrophotosensitive member was prepared in the same manner as in Example 1 except that the oxytitanium phthalocyanine crystal (disclosed in Japanese Laid-Open Patent Application (KOKAI) No. 17066/1989) prepared in Comparative Synthesis Example 3 was used.

The above-prepared four electrophotosensitive members prepared in Example 1 and Comparative Examples 1-3 were attached to laser beam printers (LBP-SX, manufactured by Canon K. K.), respectively. Each electrophotosensitive member was charged so as to provide −700 V of dark part potential and then exposed to laser light (emission wavelength: 802 nm) to provide −150 V of exposed or light part potential. The exposure quantity ($\mu J/cm^2$) required for decreasing the potential from −700 V to −150 V was measured to evaluate the photosensitivity. The results are shown in Table 1.

TABLE 1

| Photosensitive member (Example) | Exposure quantity ($\mu J/cm^2$) |
| --- | --- |
| Example 1 | 0.26 |
| Comparative Example 1 | 0.71 |
| Comparative Example 2 | 0.75 |
| Comparative Example 3 | 0.42 |

Further, the oxytitanium phthalocyanine crystals prepared in Synthesis Examples 2 and 3 were used for providing electrophotosensitive members in the same manner as in Example 1. The exposure quantity was measured in the same manner as described above by using each of the electrophotosensitive members, so that a high electrophotosensitivity similar to that in Example 1 was obtained in each case.

The above-mentioned four electrophotosensitive members prepared in Example 1 and Comparative Examples -3 were subjected to a copying test (durability test) of 4000 sheets on condition that the initial dark part potential and light part potential were set to −700 V and −150 V, respectively. The dark part potential and light part potential were measured in some stages to evaluate electrophotosensitive characteristics, and states of images in some stages were observed. Changes in the dark part potential and contrast potential (i.e., the difference between the dark part potential and light part potential) are shown in FIGS. 14 and 15, respectively.

Figure 14:
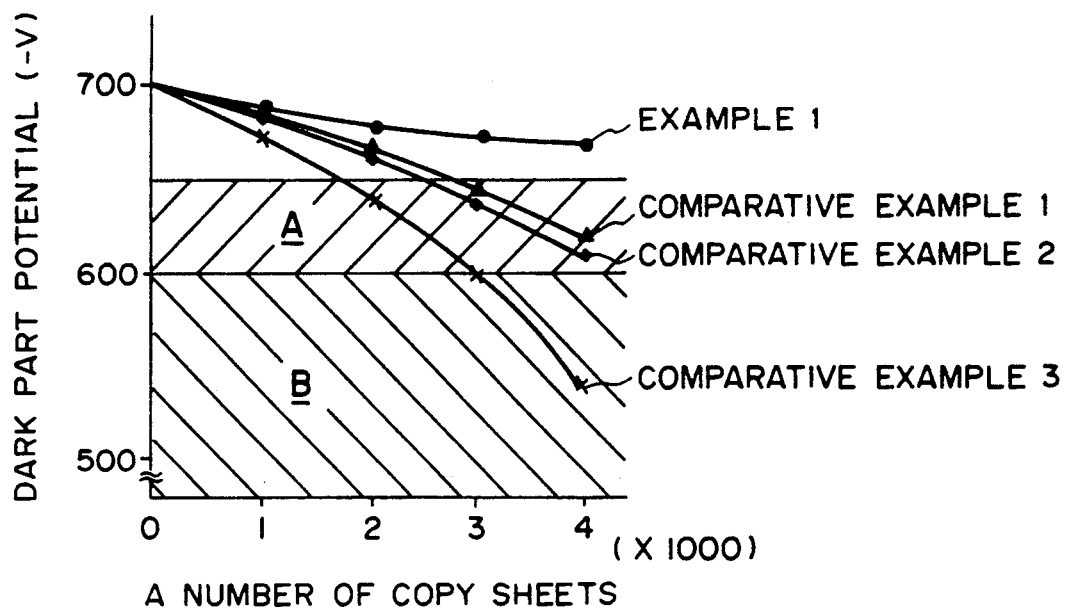
FIG. 14 is a diagram showing changes in dark part potential of electrophotosensitive members prepared in Example 1 and Comparative Examples 1-3 with respect to a continuous copying test.
Figure 15:
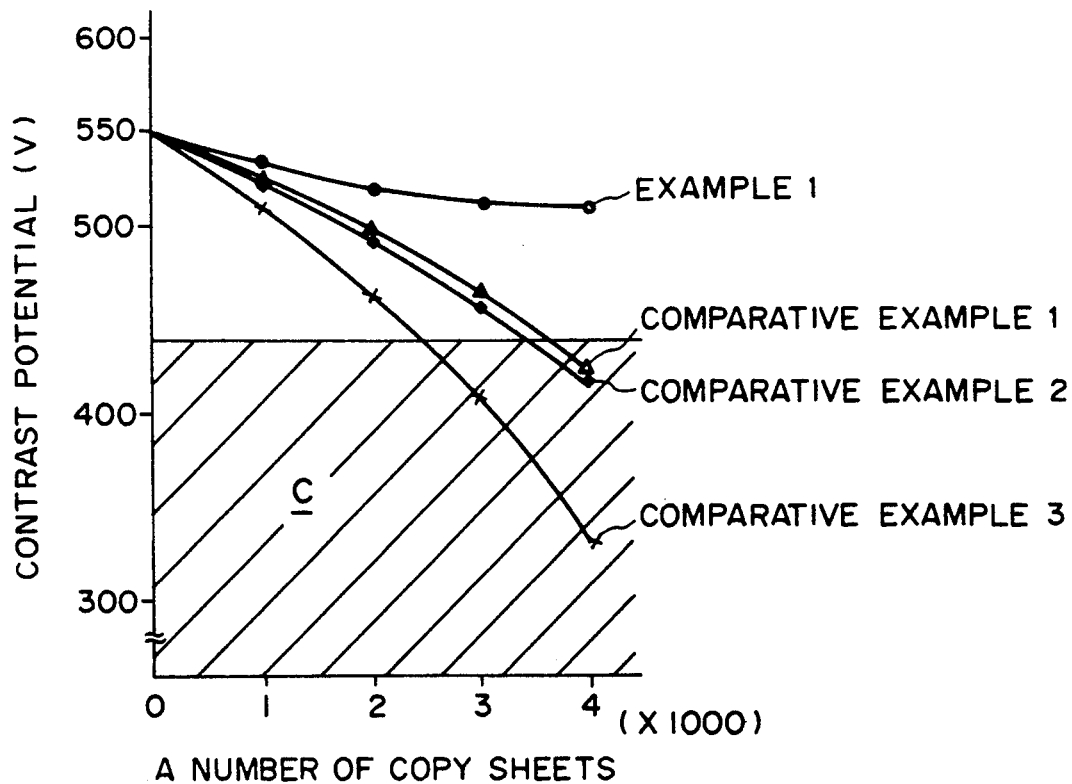
FIG. 15 is a diagram showing changes in contrast potential of electrophotosensitive members prepared in Example 1 and Comparative Examples 1-3 with respect to a continuous copying test.

As is apparent from FIG. 14, the electrophotosensitive member of Example 1 provided a good image similar to the initial image. On the other hand, the electrophotosensitive members of Comparative Examples 1–3 provided images each having fog on the white background (the hatched region A in FIG. 14) particularly, the electrophotosensitive member of Comparative Example 3 provided an image having remarkable fog on the white background after the copying of 4000 sheets (the hatched region B in FIG. 14). Further, in order to prevent fog from the white background, the density was controlled by means of a density control lever when the electrophotosensitive members of Comparative Examples 1–3 were used, whereby the density of a black portion became insufficient as shown in FIG. 15 (the hatched region C).

Separately, there were provided four electrophotosensitive members prepared in the same manner as in Example 1 and Comparative Examples 1–3. A part of each electrophotosensitive member was irradiated with white light (1500 lux) for 30 minutes. Each electrophotosensitive member was attached to the above-mentioned laser beam printer and charged with respect to both the irradiated and non-irradiated parts so as to provide −700 V of surface potential to the non-irradiated part. Then, the surface potential of the irradiated part was measured to evaluate the charging characteristic. The results are shown in Table 2.

TABLE 2

| Photosensitive member (Example) | Non-irradiated part (V) | Irradiated part (V) | Difference (V) |
| --- | --- | --- | --- |
| Example 1 | −700 | −660 | 40 |
| Comparative Example 1 | −700 | −625 | 80 |
| Comparative Example 2 | −700 | −625 | 75 |
| Comparative Example 3 | −700 | −595 | 105 |

Further, the oxytitanium phthalocyanine crystals prepared in Synthesis Examples 2 and 3 were used for providing electrophotosensitive members in the same manner as in Example 1. The electrophotosensitive members were subjected to the above measurement to provide a good photomemory characteristic (a charging characteristic after light irradiation) similar to that in Example 1.

Figure 16:
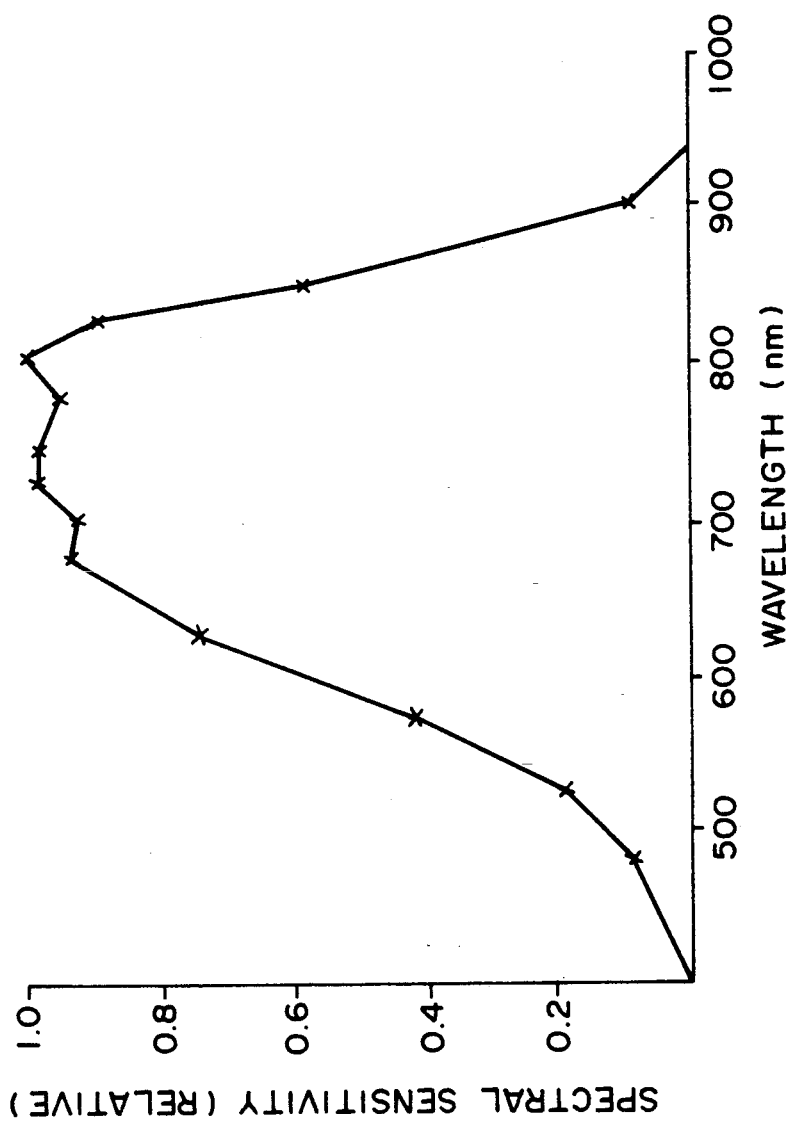
FIG. 16 is a diagram showing spectral sensitivity of an electrophotosensitive member prepared in Example 1.

In FIG. 16, spectral sensitivity of the electrophotosensitive member of Example 1 is shown relative to the maximum value of spectral sensitivity which is represented by 1.0. Referring to FIG. 16, an electrophotosensitive member using an oxytitanium phthalocyanine crystal of the invention showed a stable and high photosensitivity in the long-wavelength region of 770–810 nm.

The coating liquid for providing the charge generation layer in Example 1 which comprised the oxytitanium phthalocyanine crystal of the invention was left standing for one month. The oxytitanium phthalocyanine crystal was recovered from the resultant coating liquid and was subjected to X-ray diffraction analysis, whereby the X-ray diffraction pattern caused no change and it was found that the original crystal form was retained. Accordingly, the oxytitanium phthalocyanine crystal of the invention showed an excellent liquid stability.

A part of the electrophotosensitive member was slowly dipped in a beaker filled with methyl ethyl ketone for 1 minute and then pulled up slowly. The surface of the resultant electrophotosensitive member was washed by flowing methyl ethyl ketone thereto from a washing bottle, followed by drying for 1 hour to remove the charge transport layer and to provide the electrophotosensitive layer wherein a part of the charge generation layer was exposed. The part of the charge generation layer was cut off together with an aluminum cylinder and was subjected to X-ray diffraction analysis. Conditions of the X-ray diffraction analysis were as shown below.

Measuring machine: Full-automatic X-ray diffraction apparatus: MXP[18] manufactured by Mac Science Co.
X-ray tube (Target): Cu
Tube voltage: 40 KV
Tube current: 300 mA
X-ray incident angle ($\theta$): 1 deg.
Scanning speed: 4 deg./min.
Scanning method: $2\theta$ scan
Sampling width: 0.020 deg.
Starting angle ($2\theta$): 5 deg.
Stopping angle ($2\theta$): 35 deg.
Divergence slit: 0.28 mm
Scattering slit: 3.2 mm
Receiving slit: 3.2 mm
Plate monochromator: used.

Figure 17:
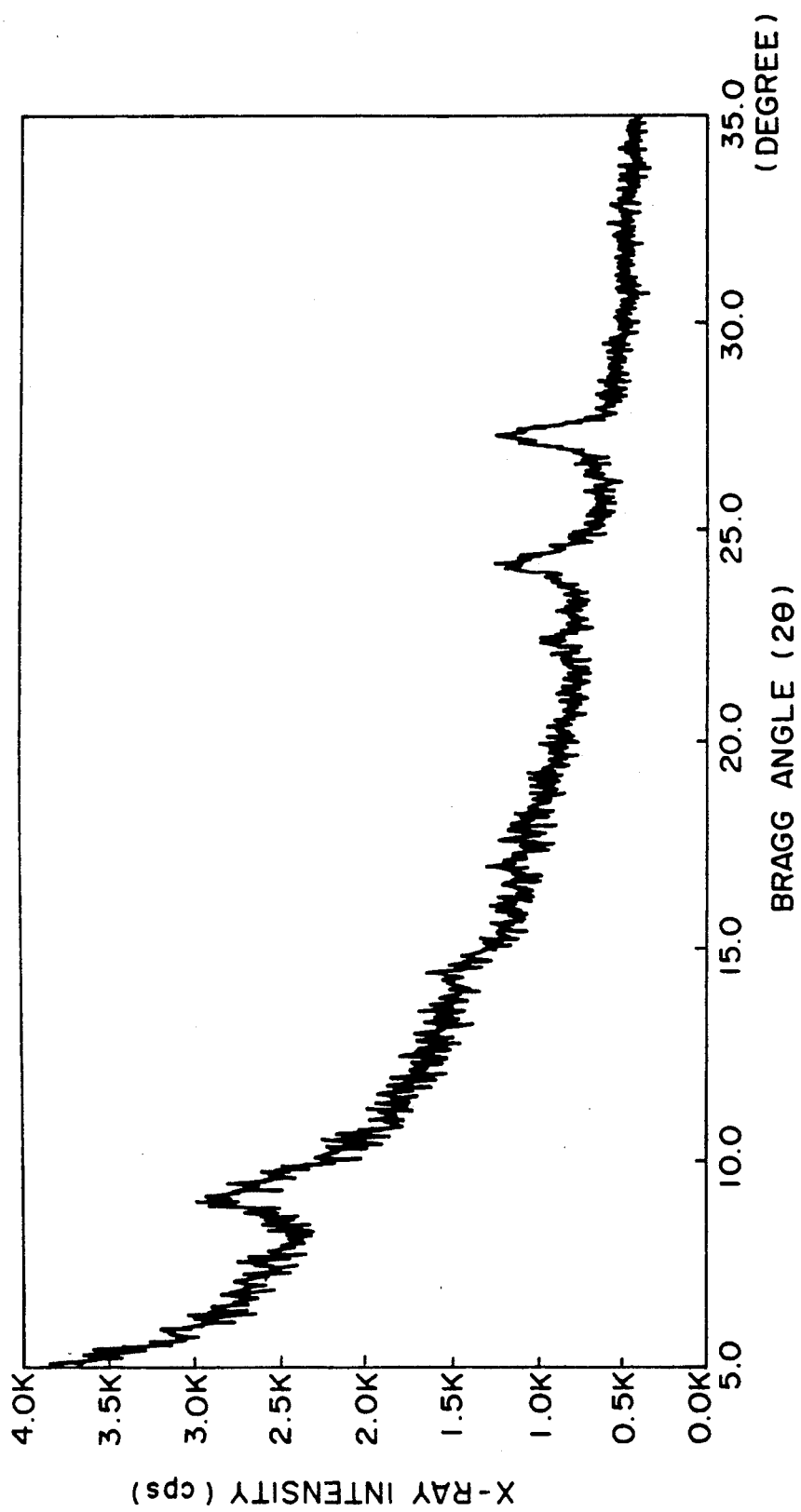
FIG. 17 shows an X-ray diffraction pattern of a charge generation layer of an electrophotosensitive member prepared in Example 1.
Figure 18:
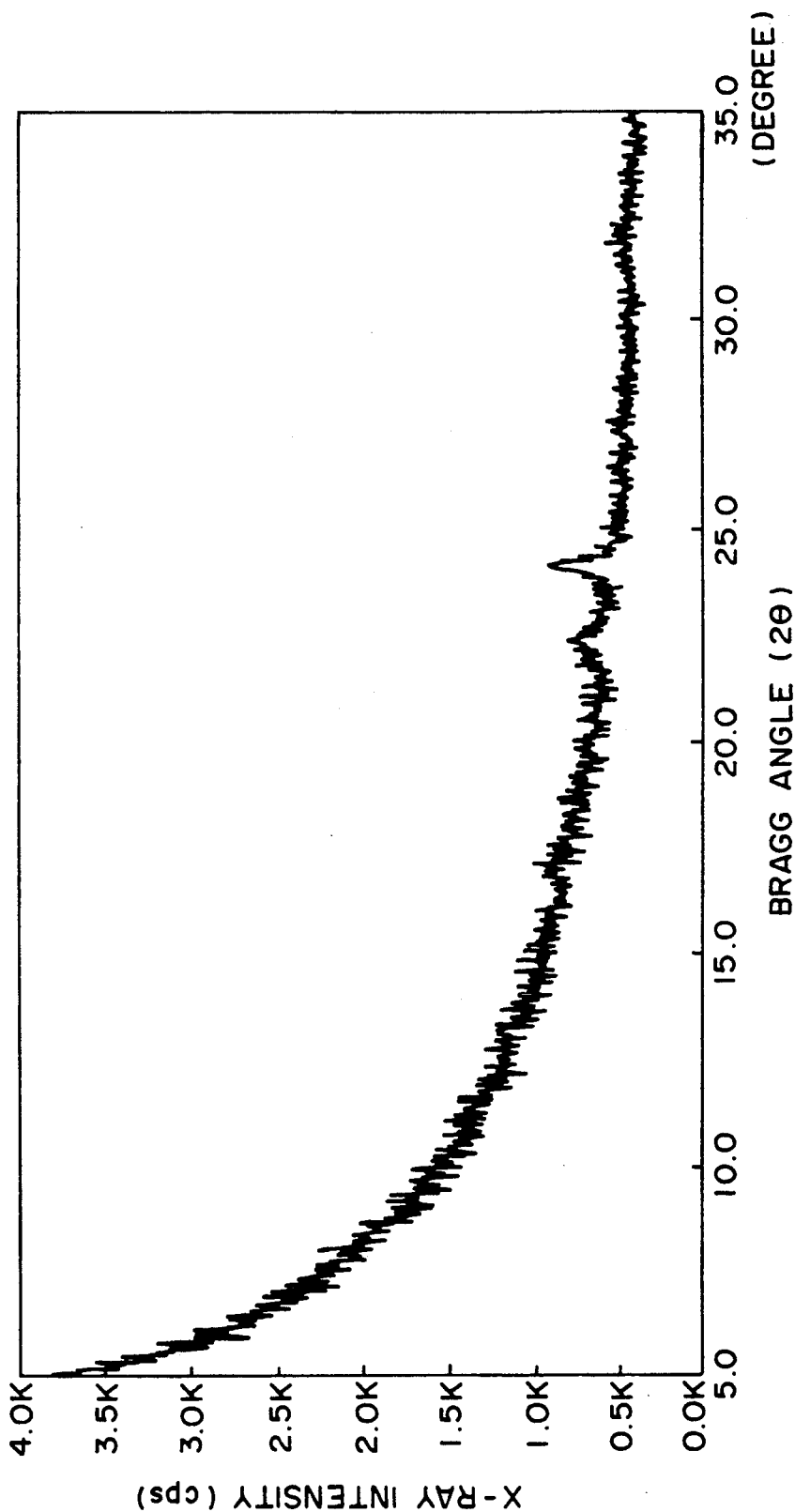
FIG. 18 shows an X-ray diffraction pattern of an aluminum cylinder used in Example 1.
Figure 19:
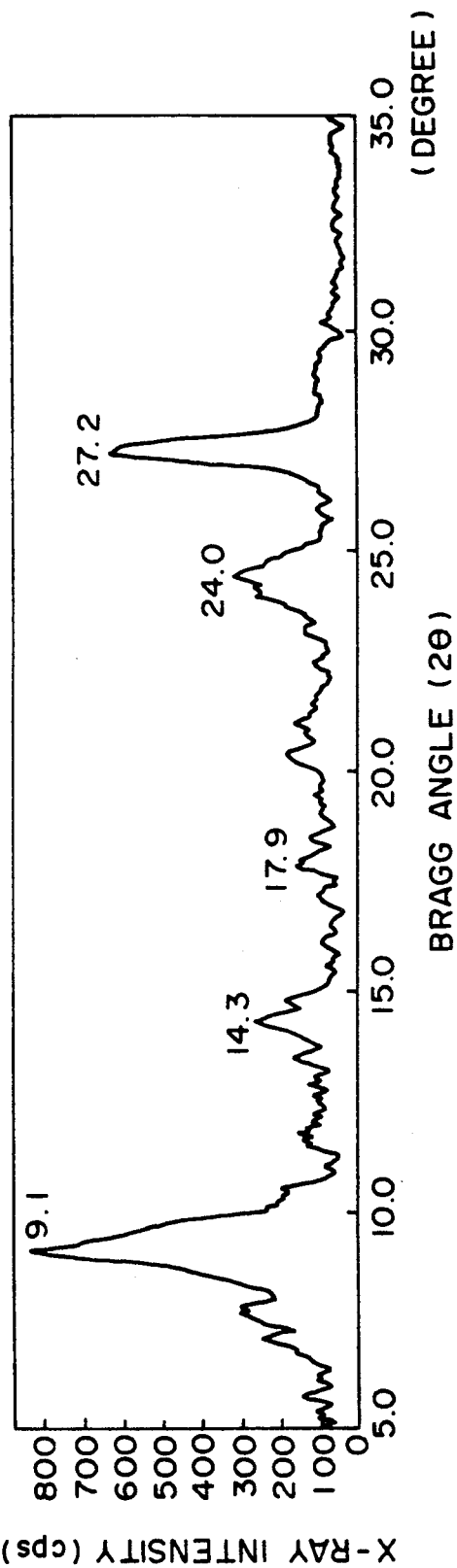
FIG. 19 shows an X-ray diffraction pattern obtained by subjecting the X-ray diffraction pattern of the charge generation layer of the electrophotosensitive member prepared in Example 1 to background removal and smoothing.

An X-ray diffraction pattern of the above-prepared charge generation layer is shown in FIG. 17. An X-ray diffraction pattern of the aluminum cylinder alone is shown in FIG. 18. The result of an X-ray diffraction pattern obtained by subtracting the values of X-ray intensity shown in FIG. 18 from that shown in FIG. 17 was subjected to background removal and further to smoothing. The resultant X-ray diffraction pattern is shown in FIG. 19. Referring to FIG. 19, the strong peaks of 9.0 degrees, 14.2 degrees and 27.1 degrees (Bragg angle, $2\theta \pm 0.2$ degree) characteristic of the oxytitanium phthalocyanine crystal of the present invention were also recognized.

EXAMPLE 2

An electrophotosensitive member was prepared in the same manner as in Example 1 except that a bisphenol Z-type polycarbonate resin (Mw=20,000) was used as a binder resin of a charge generation layer.

EXAMPLE 3

An electrophotosensitive member was prepared in the same manner as in Example 1 except that a compound represented by the following formula:

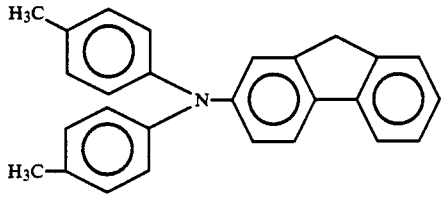

was used as a charge-transporting material.

EXAMPLE 4

An electrophotosensitive member was prepared in the same manner as in Example 1 except that a compound represented by the following formula:

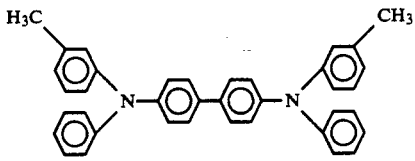

was used as a charge-transporting material.

The above-prepared three electrophotosensitive members prepared in Examples 2-4 were subjected to measurement of exposure quantity in the same manner as in Example 1 to evaluate the photosensitivity.

TABLE 3

| Photosensitive member (Example) | Exposure quantity ($\mu J/cm^2$) |
|---|---|
| Example 2 | 0.27 |
| Example 3 | 0.27 |
| Example 4 | 0.28 |

EXAMPLE 5

On a 50 micron-thick aluminum sheet substrate, a primer layer similar to the one in Example 1 was formed by means of a bar coater, and a 20 micron-thick charge transport layer similar to the one in Example 1 was further formed thereon. Separately, 3 parts of the oxytitanium phthalocyanine crystal prepared in Synthesis Example 1 was mixed with a solution of 5 parts of a bisphenol Z-type polycarbonate resin (Mw=20,000) in 68 parts of cyclohexane and were dispersed for 1 hour by means of a sand mill. To the resultant dispersing liquid, 5 parts of a bisphenol Z-type polycarbonate resin (Mw=20,000) and 10 parts of the charge-transporting material used in Example 1, followed by dilution with 40 parts of tetrahydrofuran and 40 parts of dichloromethane to provide a dispersion paint. The resultant paint was applied onto the above-prepared charge transport layer by spray coating, followed by drying the resultant coating to form a 6 micron-thick charge generation layer, whereby an electrophotosensitive layer was prepared.

COMPARATIVE EXAMPLE 4

An electrophotosensitive member was prepared in the same manner as in Example 5 except that the $\alpha$-type oxytitanium phthalocyanine crystal prepared in Comparative Synthesis Example 1 was used.

COMPARATIVE EXAMPLE 5

An electrophotosensitive member was prepared in the same manner as in Example 5 except that the A-type oxytitanium phthalocyanine crystal prepared in Comparative Synthesis Example 2 was used.

COMPARATIVE EXAMPLE 6

An electrophotosensitive member was prepared in the same manner as in Example 5 except that the oxytitanium phthalocyanine crystal (disclosed in Japanese Laid-Open Patent Application (KOKAI) No. 17066/1989) prepared in Comparative Synthesis Example 3 was used.

The above-prepared four electrophotosensitive members prepared in Example 5 and Comparative Examples 4-6 were subjected to evaluation of photosensitivity by means of an electrostatic testing apparatus (EPA-8100, manufactured by Kawaguchi Denki K. K.). Each electrophotosensitive member was charged so as to provide 700 V (positive) of surface potential by corona charging and was exposed to monochromatic light (emission wavelength: 802 nm) isolated by means of a monochromator to provide 200 V (positive) of surface potential. The exposure quantity ($\mu J/cm^2$) required for decreasing the potential from 700 V to 200 V was measured to provide the results shown in Table 4 below.

TABLE 4

| Photosensitive member (Example) | Exposure quantity ($\mu J/cm^2$) |
|---|---|
| Example 5 | 0.42 |
| Comparative Example 4 | 0.99 |
| Comparative Example 5 | 1.05 |
| Comparative Example 6 | 0.62 |

What is claimed is:

1. Oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays.

2. A process for producing oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays, said process comprising: treating amorphous oxytitanium phthalocyanine with methanol and subjecting the treated amorphous oxytitanium phthalocyanine to milling with a solvent selected from the group consisting of ether, monoterpene hydrocarbons and liquid paraffin.

3. In an electrophotosensitive member comprising an electroconductive support and a photosensitive layer formed thereon, the improvement wherein the photosensitive layer comprises oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays.

4. An electrophotosensitive member according to claim 3, wherein the photosensitive layer is composed of a single layer.

5. An electrophotosensitive member according to claim 3, wherein the photosensitive layer comprises a charge generation layer containing a charge-generating material and a charge transport layer containing a charge-transporting material.

6. An electrophotosensitive member according to claim 3, wherein an intermediate layer is further formed between the electroconductive support and the photosensitive layer.

7. An electrophotosensitive member according to claim 3, wherein a protective layer is further formed on the photosensitive layer.

8. A device unit, comprising: an electrophotosensitive member, a charging means for charging said electrophotosensitive member prior to image exposure; and cleaning means for removing remaining toner from said electrophotosensitive member after development of said exposed image; wherein said electrophotosensitive member comprises an electroconductive support and a photosensitive layer formed thereon and said photosensitive layer comprises oxytitanium phthlocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK characteristic X-rays; said electrophotosensitive member, said charging means and said cleaning means being assembled together to form said device unit which is attachable to and removable from the body of an apparatus.

9. In an electrophotographic apparatus comprising an electrophotosensitive member, a means for forming an electrostatic latent image, a means for developing the electrostatic latent image and a means for transferring the developed image to a transfer material; the improvement wherein the electrophotosensitive member comprises an electroconductive support and a photosensitive layer formed thereon, and wherein the photosensitive layer comprises oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays.

10. A facsimile machine comprising: an electrophotographic apparatus comprising an electrophotosensitive member, wherein the electrophotosensitive member comprises an electroconductive support and a photosensitive layer formed thereon, and wherein the photosensitive layer comprises oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays; and a receiving means for receiving image data from a remote terminal.

11. A device unit according to claim 8, wherein the photosensitive layer is a single layer.

12. A device unit according to claim 8, wherein the photosensitive layer comprises a charge generation layer containing the oxytitanium phthalocyanine and a charge transport layer containing a charge-transporting material.

13. A device unit according to claim 8, wherein an intermediate layer is between the electroconductive support and the photosensitive layer.

14. A device unit according to claim 8, wherein a protective layer is on the photosensitive layer.

* * * * *

UNITED STATES PATENT AND TRADEMARK OFFICE
CERTIFICATE OF CORRECTION

PATENT NO. : 5,132,197

DATED : July 21, 1992

INVENTOR(S) : KAZUSHI IUCHI, ET AL.

Page 1 of 2

It is certified that error appears in the above-identified patent and that said Letters Patent is hereby corrected as shown below:

On title page,

IN [56] REFERENCES CITED

Under U.S. PATENT DOCUMENTS,
"4,444,861  4/1984  Fujimaki et al." should read
--4,444,861  4/1984  Nogami et al.--;
"4,664,997  5/1987  Nogami et al." should read
--4,664,997  5/1987  Suzuki et al.--;
"4,898,799  2/1990  Suzuki et al." should read
--4,898,799  2/1990  Fujimaki et al.--.

COLUMN 5

Line 6, "as" should read --are--.

COLUMN 7

Line 15, "desired" should read --desired.--.

COLUMN 10

Line 15, "Two (2)" should read --two (2)--.

COLUMN 11

Line 29, "amples -3" should read --amples 1-3--.
Line 45, "FIG. 14) particularly," should read
  --FIG. 14). Particularly,--.

COLUMN 13

Line 10, "14.2 degrees and" should read --14.2 degrees,
  23.9 degrees and--.

UNITED STATES PATENT AND TRADEMARK OFFICE
CERTIFICATE OF CORRECTION

PATENT NO. : 5,132,197

DATED : July 21, 1992

INVENTOR(S) : KAZUSHI IUCHI, ET AL.

It is certified that error appears in the above-identified patent and that said Letters Patent is hereby corrected as shown below:

COLUMN 15

Line 43, "CuK" should read --CUKα--.

Signed and Sealed this

Fourteenth Day of September, 1993

Attest:

BRUCE LEHMAN

Attesting Officer     Commissioner of Patents and Trademarks